(12) United States Patent
McCabe et al.

(10) Patent No.: US 7,982,359 B2
(45) Date of Patent: Jul. 19, 2011

(54) HIGH EFFICIENCY SALIENT POLE MACHINE AND METHOD OF FORMING THE SAME

(75) Inventors: Joseph B. McCabe, Jackson, TN (US); Brian N. Cox, Lexington, TN (US); Louis R. Myers, Mankato, MN (US); Jacques Andre Saint-Michel, Angouleme (FR); John T. Fowler, Wisconsin Dells, WI (US); Jerhod T. Smithback, North Mankato, MN (US); Joshua A. Lorenz, North Mankato, MN (US)

(73) Assignee: Emerson Electric Co., St. Louis, CO (US)

( * ) Notice: Subject to any disclaimer, the term of this patent is extended or adjusted under 35 U.S.C. 154(b) by 520 days.

(21) Appl. No.: 11/866,071

(22) Filed: Oct. 2, 2007

(65) Prior Publication Data
US 2009/0083966 A1    Apr. 2, 2009

(51) Int. Cl.
*H02K 3/46*   (2006.01)
(52) U.S. Cl. .......................................... 310/270; 310/269
(58) Field of Classification Search .................. 310/269, 310/270, 60 R, 62–63
See application file for complete search history.

(56) References Cited

U.S. PATENT DOCUMENTS

| 4,467,229 A | 8/1984 | Ogita |
| 6,744,166 B2 | 6/2004 | Harter et al. |
| 6,849,987 B2 * | 2/2005 | Tornquist et al. ............. 310/270 |

FOREIGN PATENT DOCUMENTS

JP         10041658 A  *  2/1998

OTHER PUBLICATIONS

International Search Report for Corresponding International Patent Application No. PCT/US2008/78135.
Written Opinion for Corresponding International Patent Application No. PCT/US2008/78135.

* cited by examiner

*Primary Examiner* — Quyen Leung
*Assistant Examiner* — Leda Pham
(74) *Attorney, Agent, or Firm* — Locke Lord Bissell & Liddell LLP

(57) ABSTRACT

A salient pole machine and method of forming the same comprising a rotating field assembly and at least one inter-pole cap connected to the rotating field assembly and/or at least end coil cap connected to the rotating field assembly. Each inter-pole cap preferably includes a top surface that has a curvature and/or at least one cavity. Each end coil cap may include at least one support. The salient pole machine may also include at least one fan assembly independent of the rotating field assembly. In a preferred embodiment, the salient pole machine includes at least one mounting plate, wherein each fan assembly is mounted on the mounting plate. The inter-pole caps and the end coil caps preferably comprise composites, polymers, alloys, ceramics, or naturally occurring materials.

10 Claims, 7 Drawing Sheets

HIGH EFFICIENCY SALIENT POLE MACHINE AND METHOD OF FORMING THE SAME

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

FIELD OF THE INVENTION

The invention relates to salient pole machines, including generators and motors.

BACKGROUND OF THE INVENTION

In the prior art, the initial cost of salient pole machines such as generators and motors was the major factor in purchasing an electric salient pole machine of a given kW, along with the design and enclosure from among suppliers known to provide adequate reliability and availability. Salient pole machines were normally purchased at the lowest costs and, in most cases, operating losses were largely ignored.

However, the price of crude oil continues to escalate and the operating costs of these devices are now a significant factor in the selection of salient pole machines. The operating cost associated with generating electric energy from salient pole machines cannot be ignored. Furthermore, the reduction in green house gases associated with more efficient generation of electricity is also desired.

Prime power applications are one area in which high efficiency generators units benefit from the teachings of this invention. The benefit from this increased efficiency versus the increased cost of the unit can be relatively short and very attractive economically. Therefore, a need exists to increase the efficiency of salient pole machines.

Windage losses are losses associated with the cooling fans and the salient pole design of the salient pole machine field. In some applications, windage losses can be the largest individual loss component present in the unit. This is due to the need for large amounts of air flow required to avoid excessive temperature rises. Additionally, there are high pressure drops induced by unfavorable geometry. Both of these phenomena have lead to very poor fan efficiency in the prior art, which results in large amounts of losses. Therefore, a need exists to reduce windage losses, and therefore improve the efficiency of salient pole machines.

BRIEF SUMMARY OF THE INVENTION

High efficiency salient pole machine such as generators should be selected when the savings in fuel usage is desirable. However, high efficiency salient pole machines provide benefits over and above the fuel savings. The lower loss machines produce less heat and therefore, run at much cooler temperatures than less efficient models. These lower temperatures result in substantially longer salient pole machine life since the life of insulating materials decrease as temperature rises.

To reduce the losses associated with the shaft mounted cooling fans, a new concept of small induction motor driven fans was used to cool the unit. To minimize the salient pole turbulent losses, composite inter-pole caps and composite end coil caps were used to lessen drag. In addition, fan assemblies may be independent of the rotating field assembly.

A salient pole machine comprising a rotating field assembly and at least one inter-pole cap connected to the rotating field assembly and/or at least one end coil cap connected to the rotating field assembly. Each inter-pole cap preferably includes a top surface that has a curvature and/or at least one cavity. The end coil cap may include at least one support. The salient pole machine may also include at least one fan assembly independent of the rotating field assembly. In a preferred embodiment, the salient pole machine includes at least one mounting plate, wherein each fan assembly is mounted on the mounting plate. The inter-pole caps and the end coil caps preferably comprise composites, polymers, alloys, ceramics, or naturally occurring materials.

A method of forming a salient pole machine having a rotating field assembly, the method which comprises the step of connecting at least one inter-pole cap to the rotating field assembly. The method may also include connecting at least end coil cap to the rotating field assembly and/or connecting at least one fan assembly independent of the rotating field assembly to the salient pole machine. In a preferred embodiment, the inter-pole cap comprises a top surface and wherein the top surface of each inter-pole cap has curvature.

Figure 1:
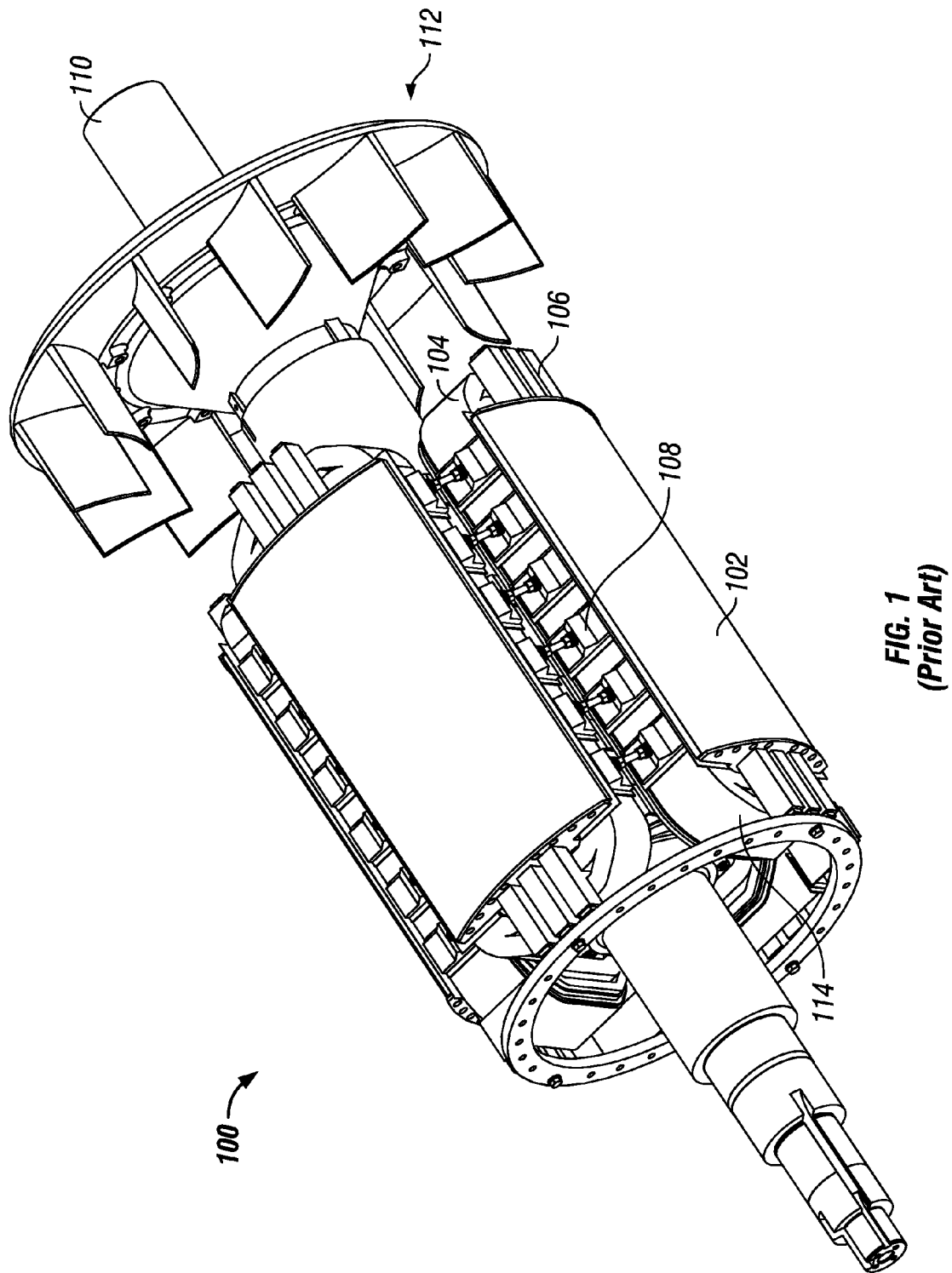
FIG. 1 shows a perspective view of the prior art of a rotating field assembly.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill in the art having benefit of this disclosure.

The salient pole machine, a generator, of the prior art lost efficiency in several areas. FIG. 1 shows a rotating field assembly 100 of a generator. The rotating field assembly 100 includes rotor poles 102, windings 104, and coil support bars 106. The windings 104 are held in place by winding supports 108. The open nature of the area between the rotor poles 102, wherein the winding supports 108 are located, tends to be an area where windage losses occur.

A fan assembly 112 is mounted a shaft 110. The prior art has incurred significant windage losses because the fan assembly 112 requires large amounts of mechanical energy. The mechanical energy required to move the air for cooling makes up a large amount of the losses in the efficiency of the system.

The portion 114 of the windings 104 that extends past the rotor poles 102 is another source of windage losses. As the rotating field assembly 100 rotates, the portion 114 of the windings 104 and coil support bars 106 induce drag that contributes significantly to losses in efficiency.

Those skilled in the art will recognize that a preferred embodiment of a salient pole machine, namely a generator, is described herein. However, all salient pole machines may benefit from the teachings of this disclosure and are considered to be within the scope of the invention as described and claimed herein. Salient pole machines are considered to include generators and motors.

Figure 2:
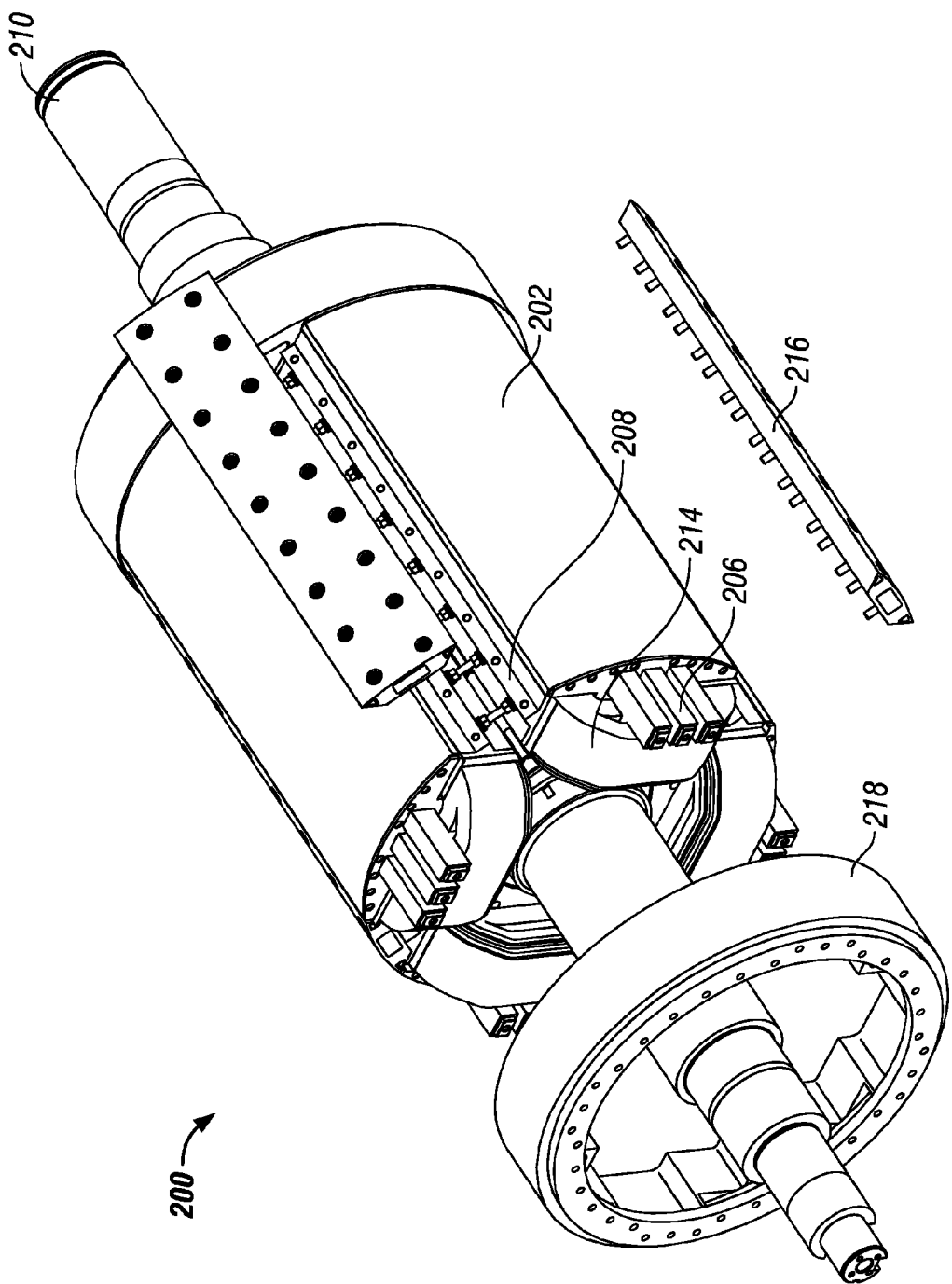
FIG. 2 shows a partially exploded, perspective view of an embodiment of a rotating field assembly.

FIG. 2 is an embodiment of a rotating field assembly 200. The open air area between rotor poles 202 and the winding supports 208 has been closed by inter-pole caps 216. The coil support bars 206 and the portion of windings 214 extending past the rotor poles 202 have been covered by end coil caps 218. There is no fan assembly attached to the shaft 210 in this embodiment.

Figure 3:
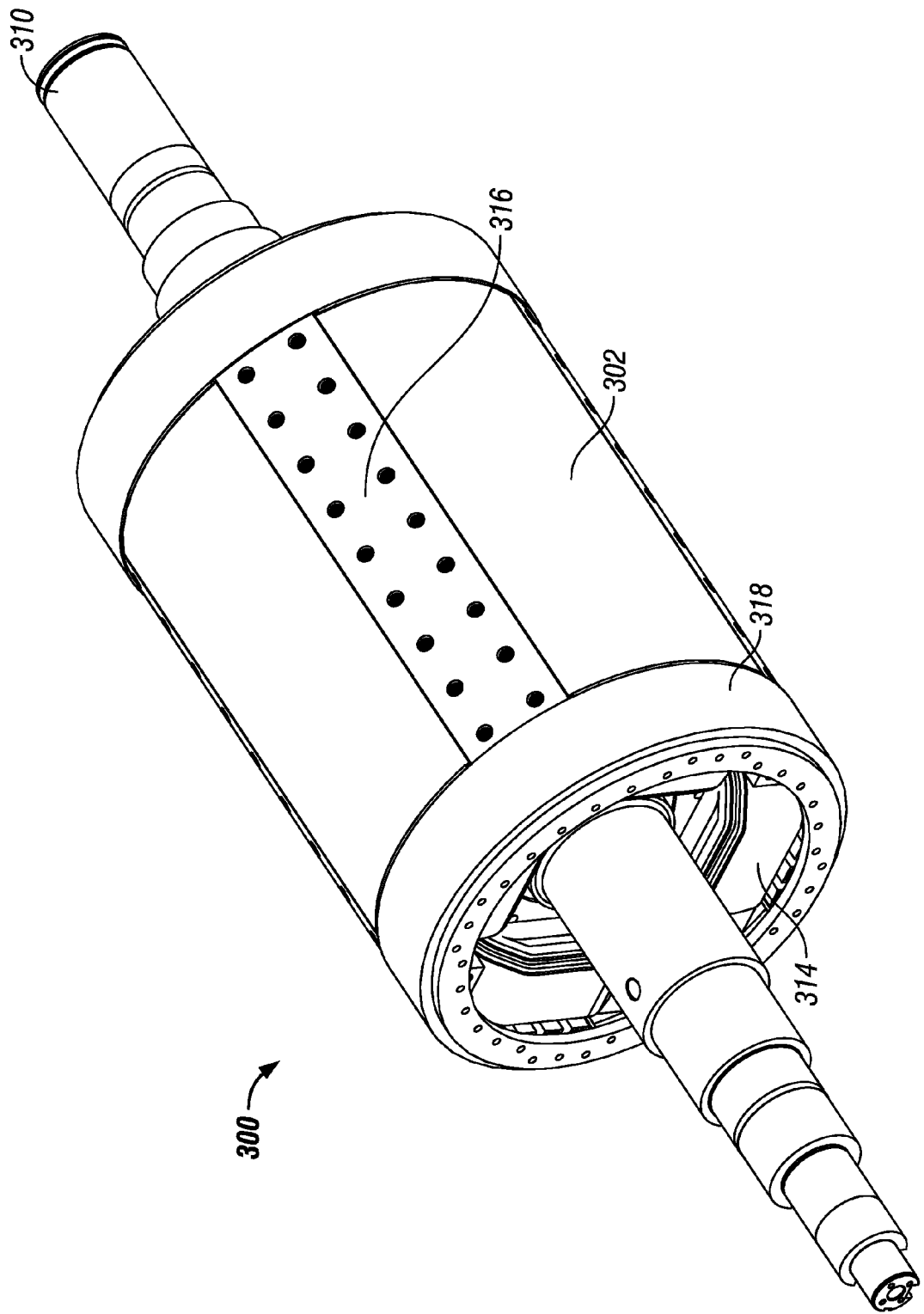
FIG. 3 shows an assembled, perspective view of an embodiment of a rotating field assembly.

FIG. 3 shows an assembled, perspective view of an embodiment of a rotating field assembly 300. As shown, the open air areas between rotor poles 302 have been closed by inter-pole caps 316. The portion of windings 314 extending past the rotor poles 302 have been covered by end coil caps 318. There is no fan assembly attached to the shaft 310 in this embodiment.

Figure 4:
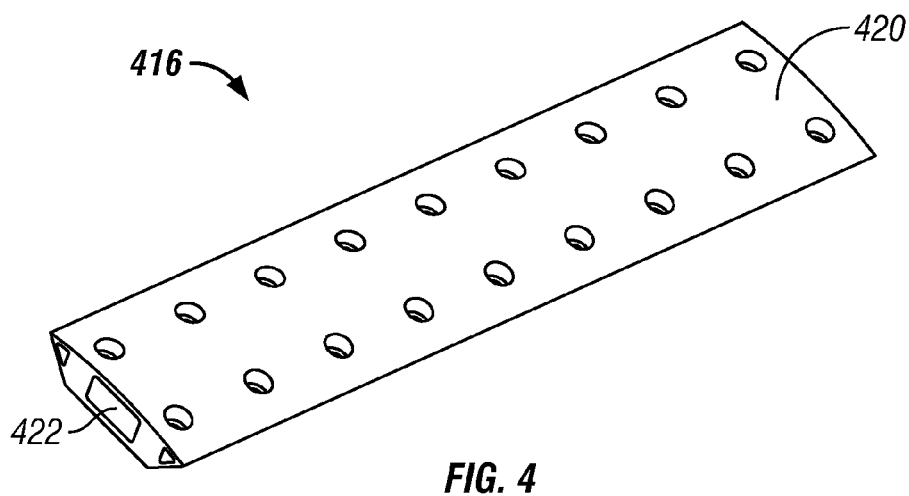
FIG. 4 shows an perspective view of an embodiment of a inter-pole cap.

FIG. 4 shows a perspective view of an embodiment of an inter-pole cap 416. The inter-pole cap 416 is designed to interface between adjacent rotor poles. In a preferred embodiment, the top surface 420 of inter-pole cap 416 may have curvature such that when assembled, the complete rotating field assembly may approach a cylindrical surface that is advantageous in reducing windage losses. In a preferred embodiment, at least one cavity 422 may be formed in the inter-pole cap 416 to both reduce cost of materials used and reduce the total mass of the inter-pole cap 416.

The inter-pole cap 416 may be formed of any material with suitable structural properties to withstand the forces associated with the rotation during operation. This may include, but is not limited to metals, composites, polymers, alloys, ceramics, naturally occurring materials, and similar materials. In preferred embodiment, glass reinforced epoxy composites are preferable for electrical, mass, and strength properties. In a most preferred embodiment, the inter-pole cap 416 may be formed from G-11 glass reinforced epoxy composite, however those skilled in the art will recognize that significant variation in materials are considered to be within the scope of the invention.

Figure 5:
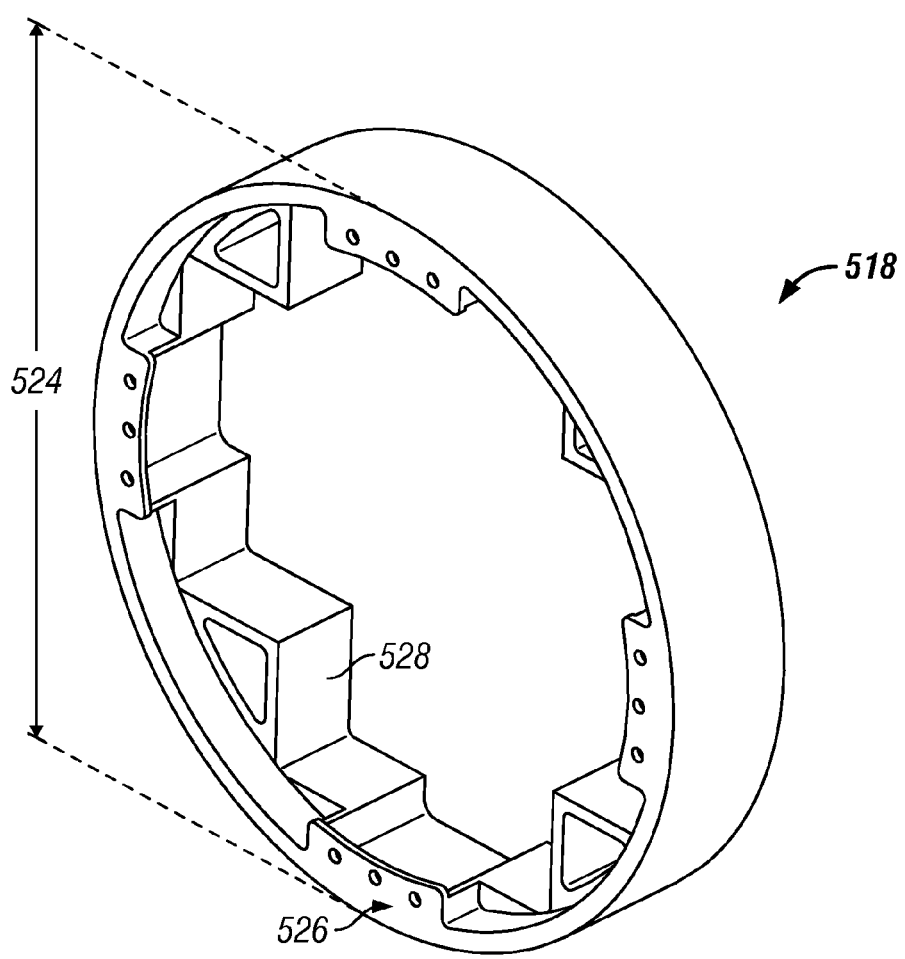
FIG. 5 shows a perspective view of an embodiment of an outboard side of an end coil cap.

FIG. 5 shows perspective views of an embodiment of an end coil cap 518. The outer diameter 524 of the end coil cap 518 is preferably similar or the same as the outer diameter of the rotating field assembly. The purpose of making this diameter substantially equal is to reduce windage losses from an uneven interface between surfaces. The depth of the end coil cap 518 is such that the full enclosure of the windings and the coil support bars is achieved. Adequate internal clearance of the windings is preferable. The mounting surface 526 on the end coil cap 518 is such that it may interface with the coil support bars. In a preferred embodiment, the end coil cap 518 is bolted to the coil support bars in an axial direction. The end coil cap 518 may also include structural supports 528 that offer additional rigidity while being formed in a manner that does not interfere with the internal components of the rotating field assembly.

The end coil cap may also be formed of any material with suitable structural properties to withstand the forces associated with the rotation during operation. This may include, but is not limited to metals, composites, polymers, alloys, ceramics, naturally occurring materials, and similar materials. In preferred embodiment, glass reinforced epoxy composites are preferable for electrical, mass, and strength properties. In a most preferred embodiment, the inter-pole cap 518, 618 may be formed from G-11 glass reinforced epoxy composite, however those skilled in the art will recognize that significant variation in materials are considered to be within the scope of the invention.

Figure 6:
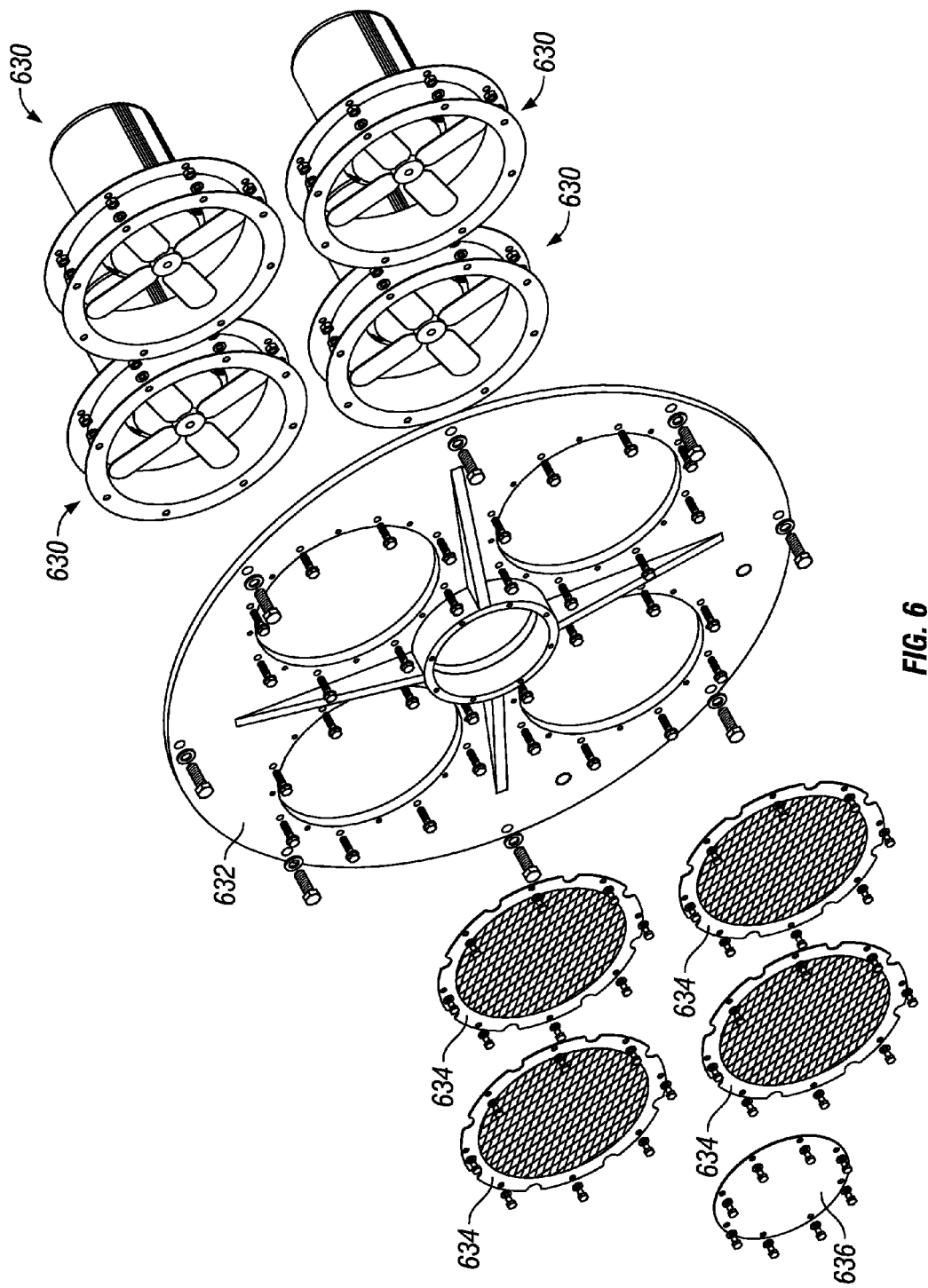
FIG. 6 shows an exploded, perspective view of an embodiment of at least one fan assembly.

FIG. 6 shows an exploded, perspective view of an embodiment of at least one fan assembly independent of the rotating field assembly. As shown, a plurality of fan assemblies 630 interface with a mounting plate 632. Screens 634 may be disposed on the mounting plate 632 on the outboard side of the fan assemblies 630. In a preferred embodiment, an access cover 636 may also be disposed on the mounting plate 632. This arrangement provides a lower load alternative to a shaft mounted fan.

Figure 7:
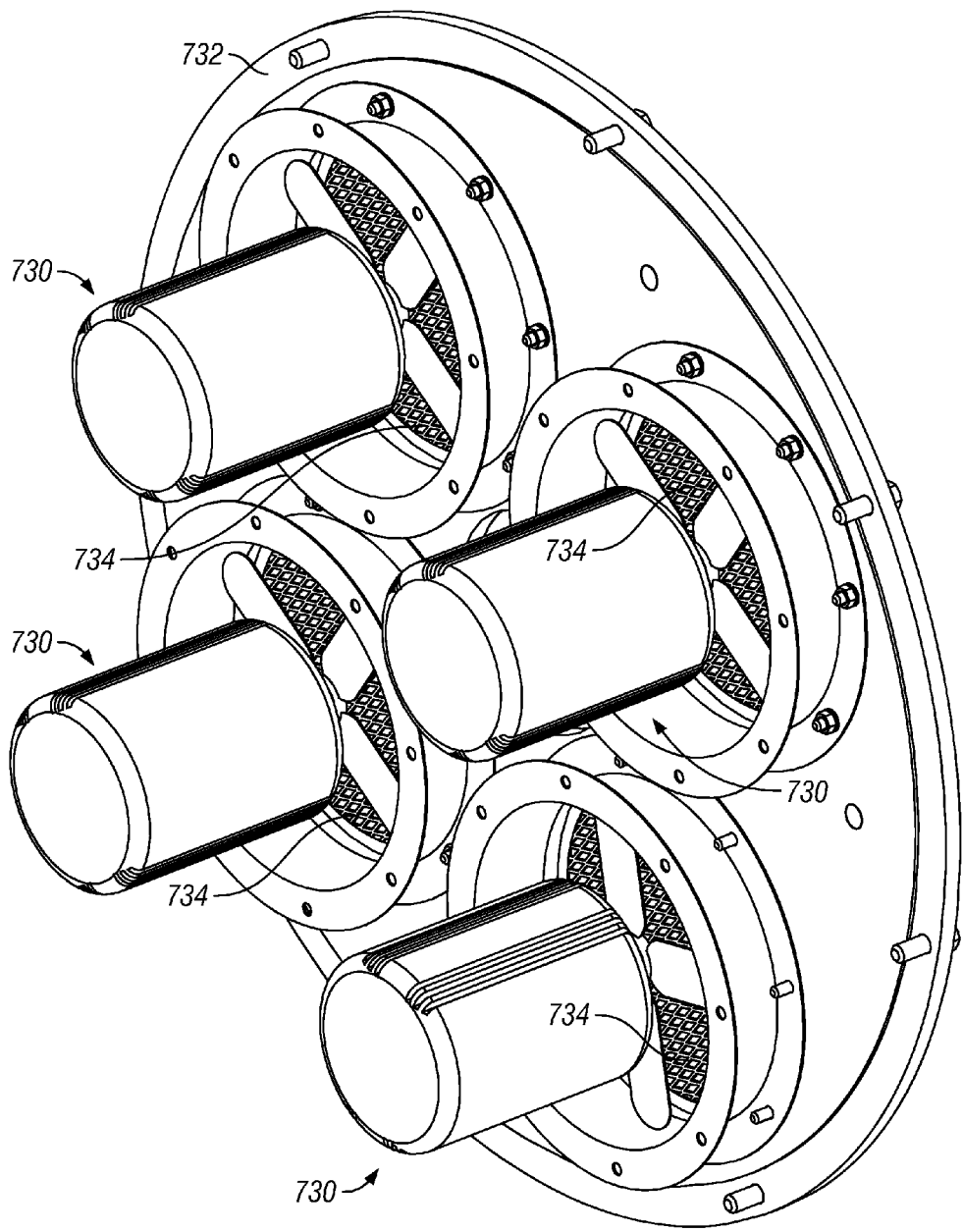
FIG. 7 shows a perspective view of an embodiment of the fan assemblies.

FIG. 7 shows a perspective view of an embodiment of the fan assemblies 730. The fan assemblies 730 interface with the mounting plate 732. These fan assemblies 730 are preferably bolted to the mounting plate 732. Screens 734 may be disposed on the mounting plate 732 on the outboard side of the fan assemblies 730. These screens 734 are preferably bolted to the mounting plate 732.

In this embodiment, four fan assemblies are shown; however those skilled in the art will recognize that any number of fan assemblies capable of providing airflow over the internal components of the salient pole machine is considered to be within the scope of the invention. Though significant variation in the amount of airflow needed is expected based on the need of the salient pole machine, the most preferred embodiment is capable of generating at least about 2000 CFM of airflow. This varies based on frame size, stack length, type of fan used, operating environments, and similar variables. The mounting plate is preferably made of steel or similarly rigid material capable of structurally supporting each fan assembly during operation. Those skilled in the art will recognize that significant variation of the material for the mounting plate is considered to be within the scope of the invention.

Figure 8:
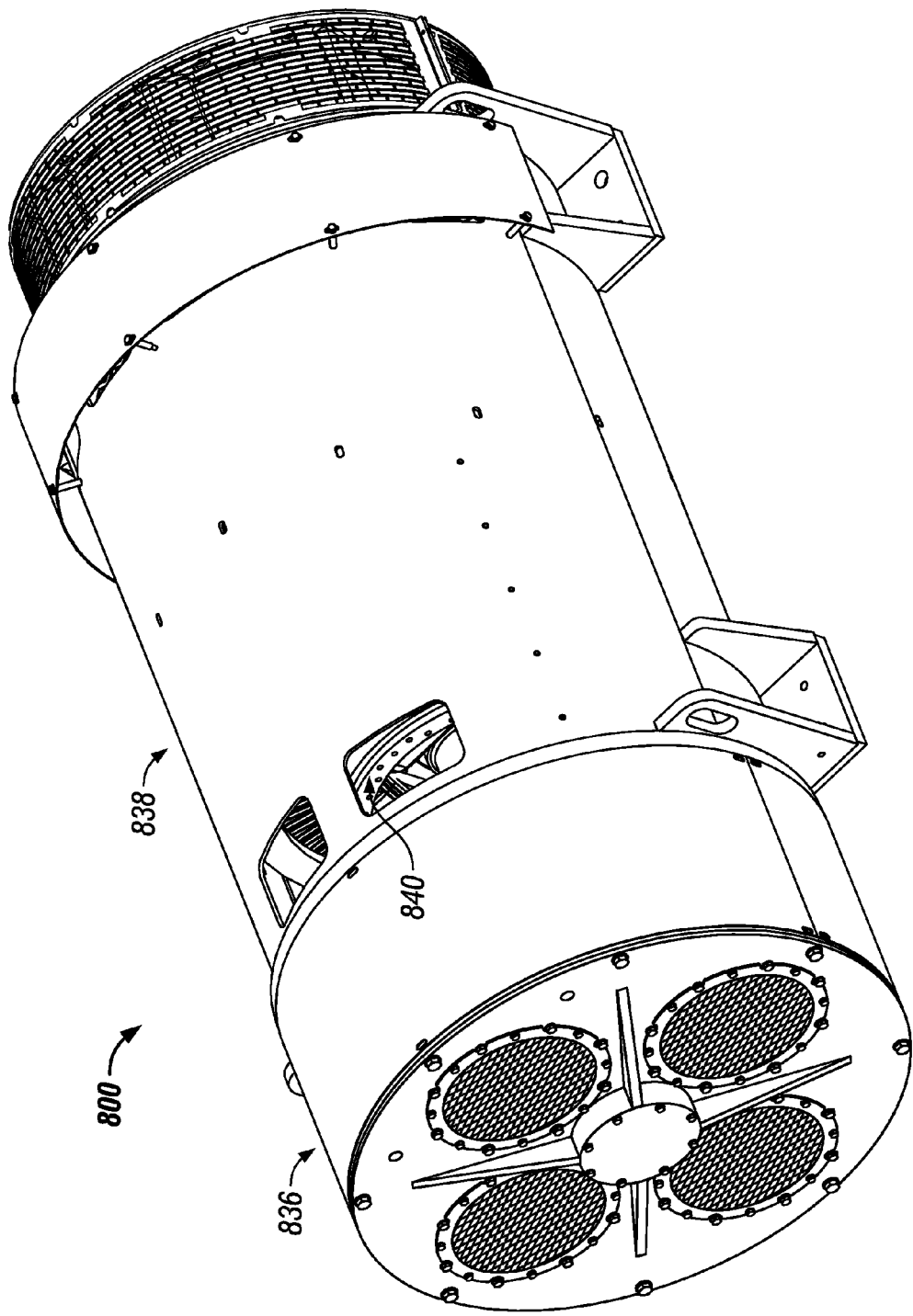
FIG. 8 shows a perspective view of an embodiment of an assembled salient pole machine.

FIG. 8 shows a perspective view of an embodiment of an assembled salient pole machine 800. The salient pole machine 800 shows the fan assembly housing 836 connected to the armature assembly 838. The rotor 840, also referred to herein as the rotating field assembly, can be seen internal of the armature assembly 838.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

What is claimed is:

1. A salient pole machine comprising:
   a rotating field assembly including one or more rotor poles, windings, and coil support bars, and a curved outer diameter, a portion of the windings extending past the rotor poles; and
   at least one end coil cap connected to the rotating field assembly and enclosing the coil support bars and the portion of windings extending past the rotor poles so as to reduce windage losses associated with the salient pole machine, the end coil cap having an outer diameter substantially equal to, or the same as, the outer diameter of the rotating field assembly,
   wherein the rotating field assembly includes an open air area between the rotor poles and the winding supports.

2. The salient pole machine of claim 1, wherein each end coil cap comprises at least one structural support formed therein in a manner that does not interfere with the internal components of the rotating field assembly.

3. The salient pole machine of claim 1, wherein each end coil cap comprises composites, polymers, alloys, ceramics, or naturally occurring materials.

4. The salient pole machine of claim 1, further comprising at least one inter-pole cap connected to the rotating field assembly and interfaced between, adjacent rotor poles.

5. The salient pole machine of claim 4, wherein each inter-pole cap comprises a top surface and wherein the top surface of each inter-pole cap has a curvature.

6. The salient pole machine of claim 4, wherein each inter-pole cap comprises at least one cavity.

7. The salient pole machine of claim 2, further comprising at least one fan assembly independent of the rotating field assembly.

8. The salient pole machine of claim 7, further comprising at least one mounting plate, wherein each fan assembly is mounted on the mounting plate.

9. The salient pole machine of claim 3, wherein each end coil cap is formed from glass reinforced epoxy composites.

10. The salient pole machine of claim 4, wherein each inter-pole cap is formed from glass reinforced epoxy composites.

* * * * *